(12) United States Patent
Han et al.

(10) Patent No.: US 10,595,248 B2
(45) Date of Patent: Mar. 17, 2020

(54) METHOD AND DEVICE FOR IDENTIFYING PSEUDO-BASE STATION BY A MOBILE TERMINAL

(71) Applicant: SAMSUNG ELECTRONICS CO., LTD., Suwon-si, Gyeonggi-Do (KR)

(72) Inventors: Shu Han, Beijing (CN); Xiaofei Li, Suwon-si (KR); Xinhe Peng, Beijing (CN)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/867,983

(22) Filed: Jan. 11, 2018

(65) Prior Publication Data

US 2019/0059032 A1 Feb. 21, 2019

(30) Foreign Application Priority Data

Aug. 17, 2017 (CN) .......................... 2017 1 0706734

(51) Int. Cl.
*H04W 36/08* (2009.01)
*H04W 8/06* (2009.01)
*H04W 36/36* (2009.01)
*H04W 12/12* (2009.01)
*H04W 88/08* (2009.01)

(52) U.S. Cl.
CPC ............. *H04W 36/08* (2013.01); *H04W 8/06* (2013.01); *H04W 12/12* (2013.01); *H04W 36/36* (2013.01); *H04W 88/08* (2013.01)

(58) Field of Classification Search
CPC ....... H04W 12/12; H04W 12/00; H04W 4/80; H04W 60/04; H04W 84/18; H04W 88/08
See application file for complete search history.

(56) References Cited

U.S. PATENT DOCUMENTS

| 6,490,455 | B1 | 12/2002 | Park et al. |
| 9,026,129 | B2 | 5/2015 | Dean et al. |
| 9,042,839 | B2 | 5/2015 | Takahashi |
| 9,247,461 | B2 | 1/2016 | Kondo |
| 9,451,395 | B2 | 9/2016 | Kwak et al. |
| 2015/0271194 | A1 | 9/2015 | Szucs et al. |
| 2018/0302872 | A1* | 10/2018 | Liu ....................... H04W 4/023 |

FOREIGN PATENT DOCUMENTS

| CN | 103874068 | 6/2014 |
| CN | 104219671 | 12/2014 |
| CN | 105357672 | 2/2016 |
| CN | 105744529 | 7/2016 |
| JP | 4037864 | 1/2008 |
| KR | 10-2008-0006093 | 1/2008 |

* cited by examiner

*Primary Examiner* — Liton Miah
(74) *Attorney, Agent, or Firm* — F. Chau & Associates, LLC

(57) ABSTRACT

A method and an apparatus for identifying a pseudo-base station in a mobile terminal. The method for identifying the pseudo-base station in the mobile terminal may include sending a LAU (Location Area Update) Request to a base station of a current cell; receiving a LAU Accept response from the base station indicating that LAU has been performed; and identifying the authenticity of the base station based on whether or not TMSI (Temporary Mobile Subscriber Identity) information is included in the LAU Accept response.

15 Claims, 5 Drawing Sheets

METHOD AND DEVICE FOR IDENTIFYING PSEUDO-BASE STATION BY A MOBILE TERMINAL

CROSS-REFERENCE TO RELATED APPLICATION

This application claims priority under 35 U.S.C. § 119 to Chinese Patent Application No. 201710706734.5, filed on Aug. 17, 2017, in the State Intellectual Property Office of the P.R.C. (SIPO), the contents of which are incorporated by reference herein in its entirety.

TECHNICAL FIELD

The present disclosure relates to mobile communication. More particularly, the present disclosure relates to a method and a device for identifying a base station by a mobile terminal.

DISCUSSION OF THE RELATED ART

In a wireless network environment, such as a Global System for Mobile Communication (GSM), there can be pseudo-base stations (e.g. unauthorized base stations that can send and receive messages to wireless devices such as mobile devices) that send spam messages and fraud messages to mobile devices. While a typical authorized base station will verify an end user (e.g. a mobile terminal), the end user cannot verify the authenticity of the base station. Thus, a pseudo-base station may forge parameters of the wireless network environment such that a mobile terminal preferentially selects connection to the pseudo-base station, and thus the pseudo-base station may obtain information (often illegally) about the mobile terminal by a normal Location Area Update (LAU) process so as to send the spam messages and fraud messages. As end users may send personal information in response to such messages, and/or inadvertently cause spyware and/or viruses to be loaded onto their mobile device by viewing or activating links on such spam and fraud messages, pseudo-base stations may be harmful to end users and their wireless devices. In addition, the end user may send messages that are intercepted or recorded by the pseudo-base station.

In order to protect the security of the end users, there have been three possible schemes used to identify a pseudo-base station.

The first scheme detects characteristics of a pseudo-base station that are different from cell broadcast parameters of a normal base station by analyzing parameters of a wireless network environment forged by the pseudo-base station, such that a mobile terminal identifies whether a current base station is the pseudo-base station according to a preset judgment threshold.

The second scheme checks whether a cell ID and a Location Area Identification (LAI) of a current base station are valid values, and monitors whether a sudden increase of a signal power occurs in a cell in which the current base station locates prior to the Location Area Update process. As a pseudo-base station may be a device that is often temporarily activated in a certain location, the signal power may be different from a legitimate base station, and the signal power may be stronger of the pseudo-base station may be stronger. If the cell ID and LAI of the current base station are invalid values or the sudden increase of the signal power occurs in the cell in which the current base station is located, the current base station is identified as a pseudo-base station.

The third scheme checks whether an authentication process exists in the Location Area Update process. A pseudo-base station usually does not have the authentication process as it is often employed for illegitimate purposes, and thus a base station which does not have the authentication process can be identified as a pseudo-base station. In addition, if a current base station has an authentication process, a mobile terminal may send an erroneous authentication response when the mobile terminal receives an authentication request after a preset time. Thereafter, the mobile terminal may identify whether the current base station is the pseudo-base station by observing a process on the authentication response performed by the base station.

However, all of the above three schemes have flaws that can be exploited to obtain information from end users and send them spam and fraudulent types of messages. Specifically, as for the first scheme, the pseudo-base station may revise the cell broadcast parameters appropriately, so as to avoid detection as an illegitimate base station by the mobile terminal. Meanwhile, severe operating conditions may cause the mobile terminal to identify a normal (legitimate) base station as being a pseudo-base station, and will result in frequent network re-selections that may affect a telephone connection rate and increase the power usage by the mobile terminal.

As for the second scheme, the pseudo-base station usually monitors cell IDs and LAIs of the surrounding legitimate base stations, and then will disguise its own cell ID and LAI as the cell ID and LAI of the one of the legitimate base stations. In addition, the mobile terminal is not a stationary device, as the user moves the mobile terminal within a cell, the signal power may vary for a number of reasons, and thus there is difficulty in finding an appropriate judgment threshold to detect whether the signal power of a cell suddenly increases as being a basis to determine the legitimacy of a particular base station. Meanwhile, due to wireless signal fluctuations, a legitimate base station may be identified as being a pseudo-base station.

As for the third scheme, although the pseudo-base station may be identified effectively, an adverse impact on the wireless network may be caused since network loads increase. For example, the wireless network of an operator conducts two authentication processes on the mobile terminal, which may increase signaling loads of the network significantly.

SUMMARY

Therefore, the inventive concept provides a method and an apparatus for identifying a pseudo-base station by a mobile terminal.

In addition, the inventive concept provides a method and apparatus to enhance reliability and accuracy of identifying the pseudo-base station and reduce network loads.

According to the inventive concept, there is provided a method for identifying a pseudo-base station by a mobile terminal which may include: sending a LAU (Location Area Update) Request to a base station of a current cell; receiving a LAU Accept response from the base station indicating that LAU has been performed; and identifying the authenticity of the base station based on whether or not a Temporary Mobile Subscriber Identity (TMSI) information is included in the LAU Accept.

According to an embodiment of the inventive concept, identifying the authenticity of the base station may include identifying that the base station is a pseudo-base station when the LAU Accept does not include the TMSI information.

According to an embodiment of the inventive concept, a method for identifying a pseudo-base station by a mobile terminal may additionally include: storing the TMSI information included in the LAU Accept response; sending an LAU Complete message to the base station; and identifying the authenticity of the base station based on whether or not a release signal of the control channel allocated for the LAU is received from the base station in response to sending the LAU Complete message to the base station.

According to an embodiment of the inventive concept, identifying the authenticity of the base station based on whether or not a release signal of the control channel allocated for the LAU is received from the base station may include identifying that the base station is genuine (e.g. authentic) when the release signal is received from the base station.

According to an embodiment of the inventive concept, identifying the authenticity of the base station based on whether or not the release signal is received may further include: identifying the authenticity of the base station based on whether or not a Service Access Pointer Identifier (SAPI3) Downlink Establish Request is received from the base station before receiving the release signal.

According to an embodiment of the inventive concept, identifying the authenticity of the base station based on whether or not the SAPI3 Downlink Establish Request is received before receiving the release signal may include identifying that the base station is a pseudo-base station when the SAPI3 Downlink Establish Request is received before receiving the release signal.

According to an embodiment of the inventive concept, there is provided a device for identifying a pseudo-base station in a mobile terminal, which includes: a LAU processor, configured to send an LAU Request to a base station of a current cell, and to receive a LAU Accept response from the base station indicating that LAU has been performed; and a pseudo-base station identifier, configured to identify the authenticity of the base station based on whether or not TMSI information is included in the LAU Accept response.

According to an embodiment of the inventive concept, the pseudo-base station identifier may be configured to identify that the base station is a pseudo-base station when the LAU Accept does not include the TMSI information.

According to an embodiment of the inventive concept, the pseudo-base station identifier may be further configured to identify the authenticity of the base station based on whether or not a release signal of the control channel allocated for the LAU is received from the base station, when the LAU Accept response includes the TMSI information.

According to an embodiment of the inventive concept, the pseudo-base station identifier may be further configured to identify the authenticity of the base station based on whether or not a SAPI3 Downlink Establish Request is received from the base station before receiving the release signal.

According to an embodiment of the inventive concept, the pseudo-base station identifier may be further configured to identify that the base station is a pseudo-base station when the SAPI3 Downlink Establish Request is received before receiving the release signal.

According to the present inventive concept, there is provided a computer-readable storage medium storing instructions that, when executed by a processor, causes the processor to perform the method for identifying the pseudo-base station by the mobile terminal as described above.

According to an embodiment of the inventive concept, the identifying that the base station is authentic may occur when the release signal of the control channel allocated for the LAU is received from the base station.

According to an embodiment of the inventive concept, in response to identifying that the base station is a pseudo-base station, selecting, by the mobile terminal, to reside in a previous cell.

According to the inventive concept, the device includes at least one memory configured to store TMSI information.

The at least one memory connected to at least one of the LAU processor and the pseudo base station identifier circuit, and the at least one memory is further configured to store a list of pseudo-base stations, and wherein at least one of the pseudo-base station identifier circuit and the LAU processor is configured to update a list of pseudo-base stations stored in the at least one memory.

The device may comprise a mobile terminal.

According to an embodiment of the inventive concept, a method for identifying a pseudo-base station by a mobile terminal, comprising; reselecting, by the mobile terminal, an adjacent cell as a serving cell in response to determining a channel quality parameter of the adjacent cell is greater than a current cell; comparing a Location Area Information (LAI) of the adjacent cell and the current cell, and initiating a Location Area Update (LAU) request to the base station when the LAI of the adjacent cell and the current cell are different; identifying the base station as being a pseudo-base station in response to determining receipt of an LAU Accept response from the base station and detecting a Service Access Point Identifier (SAPI) downlink is established over a current channel by the base station with a Short Message Service (SMS) message being received from the base station via the downlink; and updating storage to identify the base station as the pseudo-base station and reselecting a previous serving cell.

According to an embodiment of the inventive concept, the wherein the detecting SAPI downlink that is established comprises an SAPI3 downlink for transmitting message content, and an SAPI0 downlink for transmitting commands.

BRIEF DESCRIPTION OF THE DRAWINGS

The inventive concept will become better appreciated by a person of ordinary skill in the art, taken in conjunction with accompanying drawings in which.

DETAILED DESCRIPTION

Figure 1:
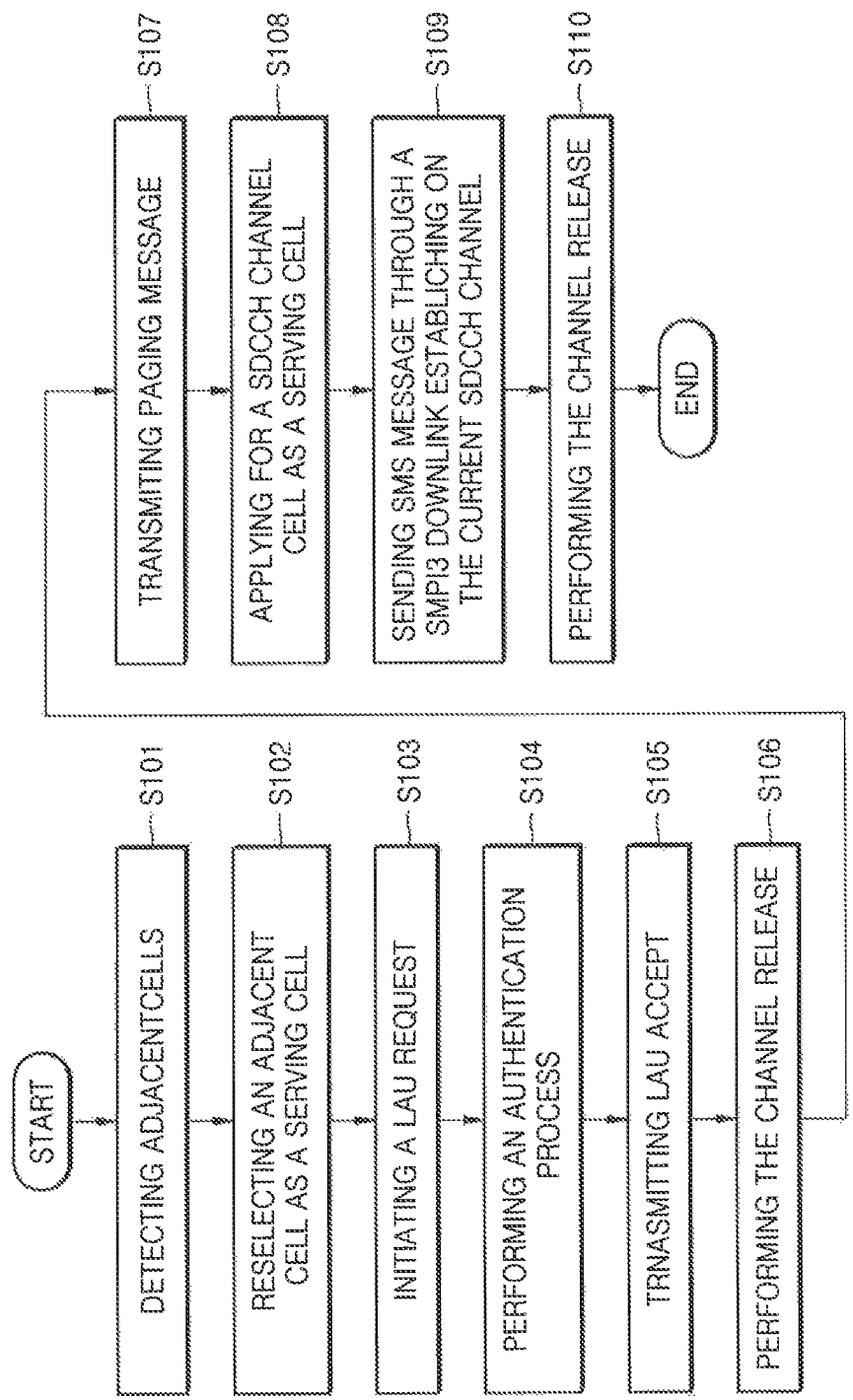
FIG. 1 is a flowchart illustrating a Location Area Update (LAU) process and a process for sending an SMS message of a normal base station.

The inventive concept will be described more fully hereinafter with reference to the accompanying drawings, in which one or more embodiments are illustrated. The inventive concept may be embodied in many different forms, and should not be construed as being limited to these embodiments set forth herein. Rather, the embodiments are provided so that this disclosure will be thorough to convey the scope of the inventive concept to those of ordinary skill in the art. In the accompanying drawings, like reference numerals may refer to like elements throughout.

A person of ordinary skill in the art should understand that, although the terms first, second and third etc. can be used herein to describe various elements, components, regions, layers and/or portions, these elements, components, regions, layers and/or portions should not be limited by these terms. These terms are used for illustrative purposes to distinguish one element, component, region, layer or portion from another. Thus, a first element, component, region, layer or portion as discussed here below could be termed a second element, component, region, layer or portion without departing from the teaching of the present disclosure. As used herein, the term "and/or" includes any and all combinations of one or more of the associated listed items.

As used herein, the singular forms "a", "an" and "the" are intended to include the plural forms as well, unless the context clearly indicates otherwise. It will be further understood that, the terms "comprises" and/or "comprising," or "includes" and/or "including" when used in this specification, specify the presence of stated features, integers, steps, operations, elements, and/or components, but does not preclude the presence or addition of one or more other features, integers, steps, operations, elements, components, and/or groups thereof.

Unless indicated otherwise, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent within the context of the relevant art and/or the present application, and will not be interpreted in an idealized or overly formal sense unless expressly so defined herein.

A person of ordinary skill in the art should understand and appreciate that a wireless network will have multiple base stations geographically dispersed to communicate with end users such as a mobile terminal. Such base stations, which are part of a network, may be referred to by persons of ordinary skill in the art as genuine, authentic, authorized, normal, legitimate, etc. Base stations that are not legitimately part of the network may sometimes be used, for example, for delivering spam messages and conducting fraudulent activity to obtain information about end users of the mobile terminals, are referred to as "pseudo-base stations". A person of ordinary skill in the art understands and appreciates the use of such terms and/or equivalent expressions used to identify such base stations.

Hereinafter, the inventive concept will be described in more detail with reference to the drawings.

FIG. 1 is a flowchart illustrating a Location Area Update (LAU) process and a process for sending a Short Message Service (SMS) message by a normal base station.

Referring to FIG. 1, in operation S101, a mobile terminal resides in a cell A, and detects system information and a signal power of a plurality of adjacent cells.

In operation S102, when the mobile terminal residing in cell A detects that a channel quality parameter C2 of an adjacent cell B is greater than that of the cell A, the mobile terminal reselects a serving cell, in this case the adjacent cell B becomes the serving cell.

In operation S103, the mobile terminal obtains a Location Area Identification (LAI) of the cell B by receiving the system information broadcasted by the cell B, compares the LAI of the cell B and that of the cell A, and when the mobile terminal determines that the LAI of cell B is different from the LAI of cell A, initiates a Location Area Update (LAU) request to a base station of the cell B.

More particularly with regard to operation S103, in response to determining by the mobile terminal that the LAI of the cell B is different from that of the cell A, the mobile terminal determines that a LAU process is required, and transmits the LAU request to the base station of the cell B. Herein, the mobile terminal may transmit a random access channel request to the base station of the cell B at first, the base station of the cell B allocates a Stand-Alone Dedicated Control Channel (SDCCH) in response to the random access channel request, and then the mobile terminal can transmit the LAU request to the base station of the cell B through the allocated SDCCH channel.

Next, in operation S104, the base station of the cell B performs an authentication on the mobile terminal.

In operation S105, after the authentication, the base station of the cell B may transmit a LAU accept (LAU ACCEPT) signal to the mobile terminal through the current SDCCH channel. Herein, the LAU ACCEPT signal transmitted by the base station of the cell B contains Temporary Mobile Subscriber Identity (TMSI) information.

Thereafter, in operation S106, the base station of the cell B transmits Channel Release signaling to the mobile terminal through the current SDCCH channel, and releases the current SDCCH channel. For example, the base station tears down (e.g. terminates) a wireless link established between the base station of the cell B and the mobile terminal. As such, the LAU process is completed. When the cell B sends an SMS message to the mobile terminal, the following operations are performed.

In operation S107, the base station of the cell B transmits paging message to the mobile terminal.

In operation S108, the mobile terminal transmits a random access channel request to the base station of the cell B to apply for a Stand-Alone Dedicated Control Channel (SDCCH) in response to the paging message transmitted by the base station of the cell B.

In operation S109, the base station of the cell B allocates a SDCCH channel in response to the random access channel request received from the mobile terminal, establishes an SAPI3 downlink on the allocated SDCCH channel, and sends the SMS message through the SAPI3 downlink. More particularly, after allocating the SDCCH channel, the base station of the cell B may establish an SAPI0 downlink and the SAPI3 downlink by transmitting signaling requesting for establishing the SAPI0 downlink and signaling requesting for establishing the SAPI3 downlink to the mobile terminal. Herein, the SAPI0 downlink is used for transmitting various commands, and the SAPI3 downlink is used for transmitting message content.

Finally, in operation S110, the base station of the cell B transmits the Channel Release signaling to the mobile terminal through the current SDCCH channel in response to acknowledge signaling which is transmitted by the mobile terminal when receiving the SMS message, and releases the current SDCCH channel, for example, tears down the SAPI0 and SAPI3 downlinks established between the base station of the cell B and the mobile terminal.

Figure 2:
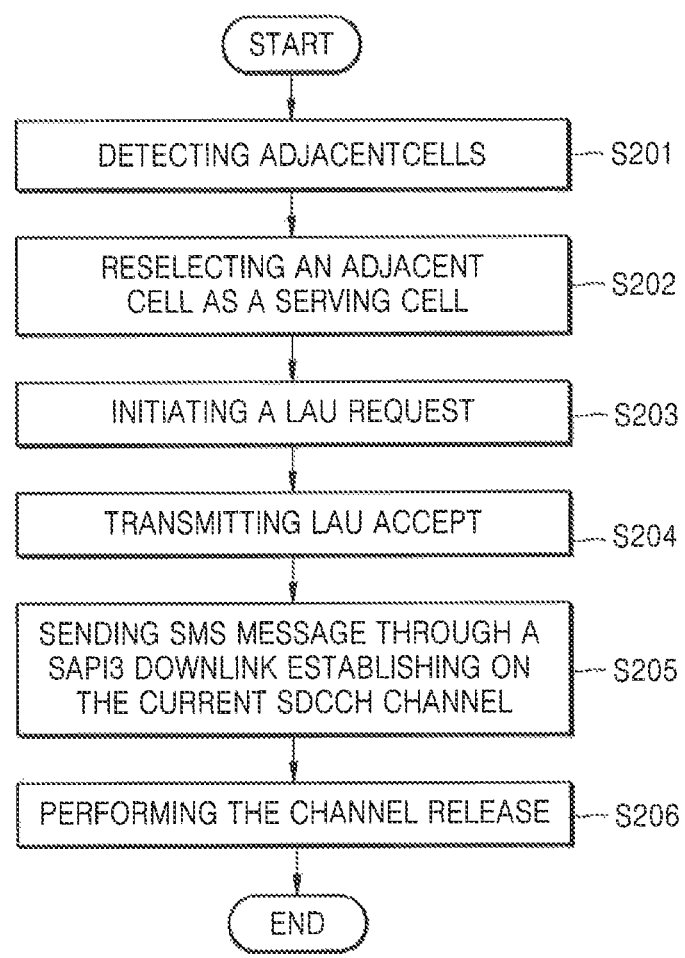
FIG. 2 is a flowchart illustrating a LAU process and a process for sending an SMS message of a pseudo-base station.

FIG. 2 is a flowchart illustrating a LAU process and a process to detect the sending of an SMS message by a pseudo-base station according to an embodiment of the inventive concept.

Referring to FIG. 2, in operation S201, a mobile terminal resides in a cell A, and detects system information and a signal power of a plurality of adjacent cells. In operation S201, when the mobile terminal detects that a channel quality parameter C2 of an adjacent cell C is greater than the channel quality parameter C2 of the cell A, the mobile terminal reselects the adjacent cell C to be a serving cell. Herein, the adjacent cell C is a pseudo-base station cell, that is, a base station of the adjacent cell C is a pseudo-base station.

In operation S203, the mobile terminal obtains an LAI of the cell C by receiving the system information broadcasted by the cell C, compares the LAI of the cell C with the LAI of the cell A, and initiates a LAU request to the base station of the cell C in response to the LAI of the cell C being different from that of the cell A.

In operation S204, the pseudo-base station of the cell C transmits a LAU ACCEPT signaling to the mobile terminal through the current SDCCH channel. Herein, the LAU ACCEPT signaling transmitted by the pseudo-base station of the cell C does not contain TMSI information.

After the LAU process is completed, in operation S205, the pseudo-base station of the cell C establishes an SAPI3 downlink on the current SDCCH channel, and sends the SMS message to the mobile terminal through the SAPI3 downlink. In operation S206, the pseudo-base station of the cell C transmits the Channel Release signaling to the mobile terminal through the current SDCCH channel in response to acknowledge signaling which is transmitted by the mobile terminal when receiving the SMS message, and releases the current SDCCH channel, for example, tears down the SAPI3 downlink established between the pseudo-base station of the cell C and the mobile terminal.

According to an embodiment of the inventive concept, by analyzing LAU processes and processes for sending the SMS message of the normal and pseudo-base stations as described above by referring to FIGS. 1 and 2, it can be determined that the pseudo-base station obtains a wireless link connection by the LAU request of the mobile terminal, and then sends spam messages and fraud messages on the established wireless link, which is the only way by which the pseudo-base station obtains the connection with the mobile terminal. Thus, in the LAU process, the pseudo-base station would not perform the channel release at operation S206, for example, the pseudo-base station would not tear down the wireless link with the mobile terminal, but send the spam messages and fraud messages through the wireless link established on the current channel. However, in the LAU process, the normal base station performs the channel release, so as to tear down the wireless link with the mobile terminal, thereby saving a wireless link resource. The performance of the channel release is an operation that is a behavioral difference between the LAU processes of the normal station versus pseudo-base stations.

Furthermore, the normal base station would transmit the authentication request in the LAU process, and carry the TMSI information in the LAU ACCEPT signaling. Then, the normal base station would transmit the Channel Release signaling to tear down the current wireless link when completing the LAU process. However, the pseudo-base station would not transmit the authentication request in the LAU process, and would not carry the TMSI information in the LAU ACCEPT signaling. Then, the pseudo-base station would not transmit the Channel Release signaling, but instead would transmit signaling for establishing the SAPI3 downlink on the current SDCCH channel, thereby establishing the wireless link for sending the spam messages and fraud messages. Only after confirming that the spam messages and fraud messages have been received by the mobile terminal does the pseudo-base station transmit the Channel Release signaling, to tear down the current wireless link.

Based on the above analysis, a method for identifying a pseudo-base station in a mobile terminal according to an embodiment of the present disclosure is described with reference to FIGS. 3 and 4.

Figure 3:
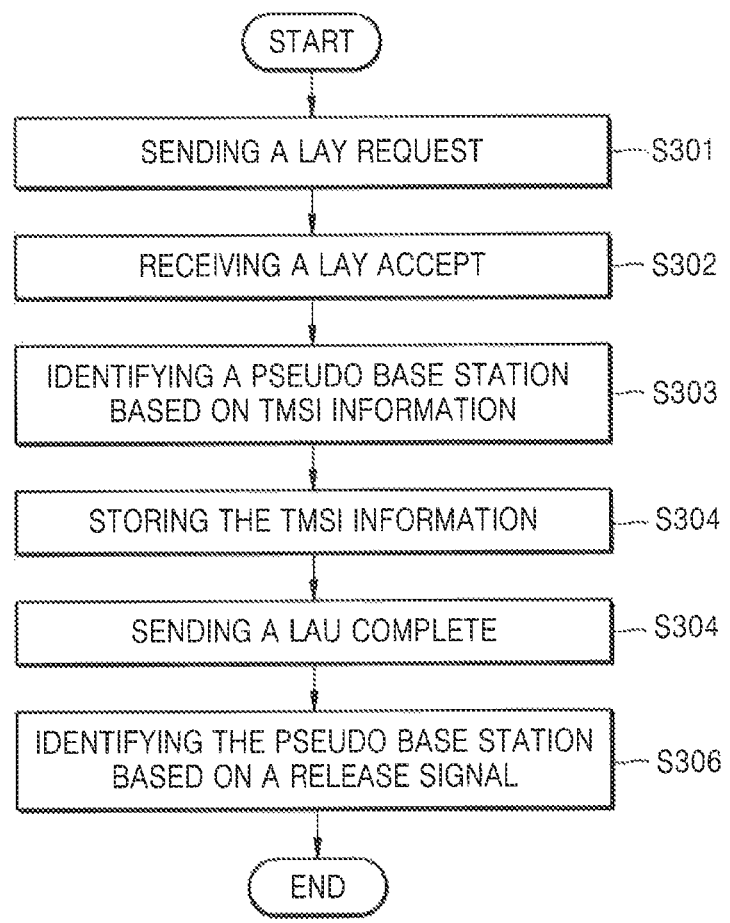
FIG. 3 is a flowchart illustrating an operative example of a method for identifying a pseudo-base station in a mobile terminal according to an embodiment of the inventive concept.

FIG. 3 is a flowchart illustrating an operative example of a method for identifying a pseudo-base station in a mobile terminal according to an embodiment of the inventive concept.

Referring to FIG. 3, in operation S301, when the mobile terminal determines that a location update is required, an LAU (Location Area Update) Request is sent to a base station of a current cell. As described above, the mobile terminal compares a Location Area Identification (LAI) of a currently resided cell (e.g., the current cell) with an LAI of a previously resided cell, and determines that the location update is required when the LAI of the current cell is different from that of the previously resided cell.

In operation S302, a LAU Accept is received from the base station indicating that the location update has been performed. For example, when the mobile terminal sends the LAU Request to the base station of the current cell, the base station in return sends the LAU Accept to the mobile terminal whether the bases station is a pseudo-base station or a genuine base station.

In operation S303, the authenticity of the base station is identified based on whether or not the Temporary Mobile Subscriber Identity (TMSI) information is included in the LAU Accept. For example, when the LAU Accept does not include the TMSI information, the base station may be identified as the pseudo-base station. Alternatively, the mobile terminal may mark the base station identified as the pseudo-base station, to avoid reselecting the cell in which the base station (e.g. the pseudo-base station) locates again.

In addition, according to the embodiment of the inventive concept, if the mobile terminal identifies the base station of the current cell as being a pseudo-base station, the mobile terminal may select to reside in the previous cell. Thereafter, if reading of a broadcast control channel (i.e. a BCCH channel) of the previous cell fails, the mobile terminal performs a cell reselection, and performs the method for identifying the pseudo-base station in the mobile terminal as described above again after performing cell reselection. On the other hand, if the mobile terminal does not identify the base station of the current cell as the pseudo-base station, the mobile terminal may select to reside in the current cell, and perform normal operations.

Alternatively, when the LAU Accept includes the TMSI information, the method for identifying the pseudo-base station in the mobile terminal according to the embodiment of the inventive concept may further include the following operations.

With continued reference to FIG. 3, in operation S304, the TMSI information included in the LAU Accept is stored. For example, the mobile terminal may store the TMSI information responding to the LAU Accept in its own memory. After the TMSI information is stored, in operation S305, a LAU Complete signal is sent to the base station. Then, in operation S306, the authenticity of the base station is identified based on whether or not a release signal (for example, Channel Release signaling) of the control channel allocated for the location update is received from the base station. For example, when the release signal is received from the base station, the base station may be identified as the genuine base station. According to the embodiment of the present disclosure, in operation S306, the authenticity of the base station may be identified at first, based on whether or not an SAPI3 Downlink Establish Request is received from the base station prior to the release signal being received. When the SAPI3 Downlink Establish Request is received from the base station prior to the release signal being received, the base station may be identified as the pseudo-base station. When the SAPI3 Downlink Establish Request is not received from the base station before the release signal is received, the authenticity of the base station may be further identified based on whether or not a release signal of the control channel allocated for the location update is received from the base station.

Figure 4:
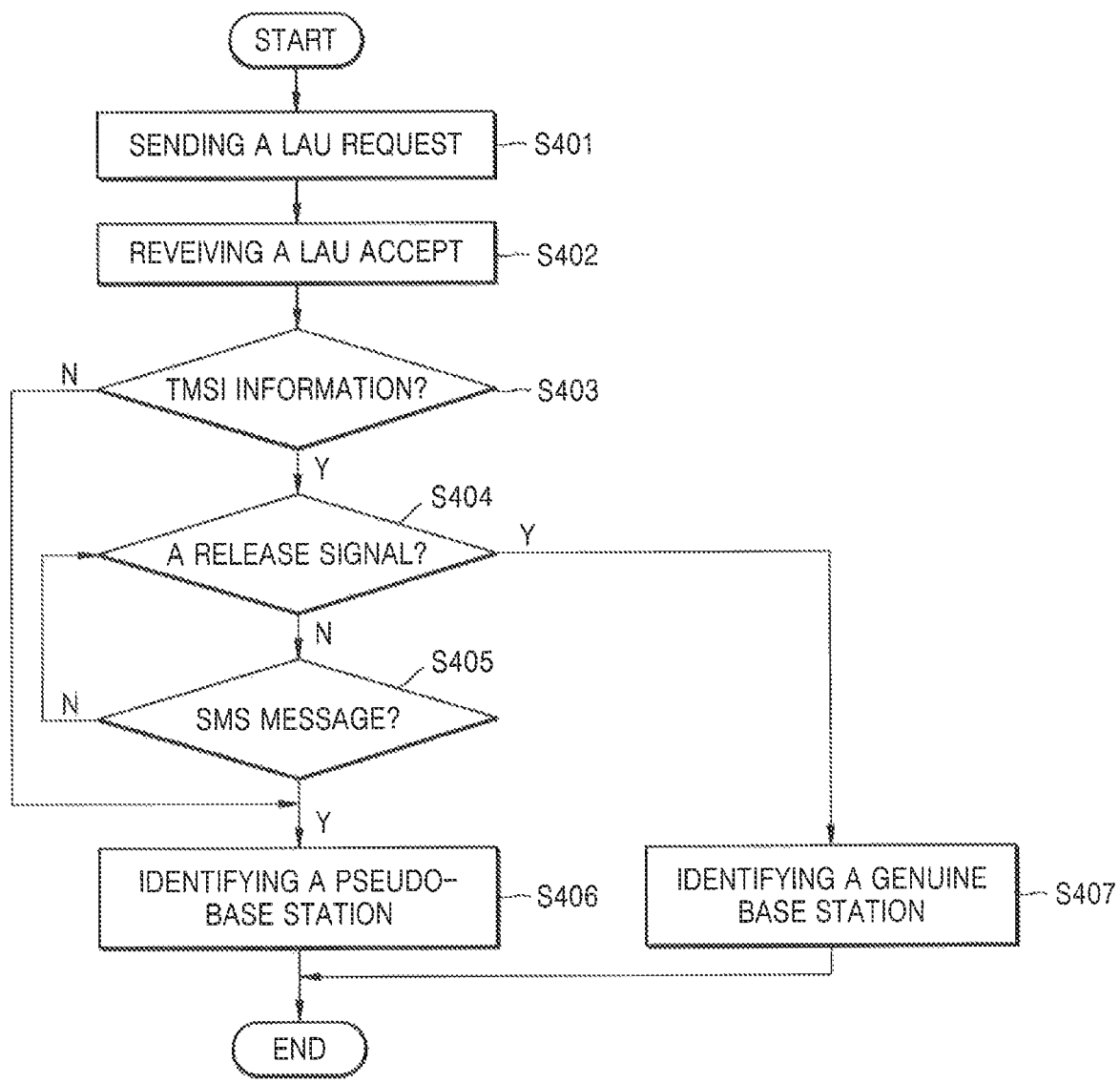
FIG. 4 is a flowchart illustrating another operative example of a method for identifying a pseudo-base station in a mobile terminal according to an embodiment of the inventive concept.

FIG. 4 is a flowchart illustrating an embodiment of a method for identifying a pseudo-base station in a mobile terminal according to the inventive concept.

Referring to FIG. 4, in operation S401, when it is determined that the location update is required, a LAU (Location Area Update) Request is sent to a base station of a current cell. In operation S402, a LAU Accept is received from the base station indicating that the location update has been performed. In operation S403, it is determined whether or not Temporary Mobile Subscriber Identity (TMSI) information is included in the received LAU Accept. If the received LAU Accept does not include the TMSI information, then in operation S406, the base station is identified as a pseudo-base station. If the received LAU Accept includes the TMSI information, then in operation S404, it is determined whether or not a release signal (for example, Channel Release signaling) of the control channel allocated for the location update is received from the base station. If the release signal is received from the base station, in operation S407, the base station is identified as a genuine (e.g. authorized, legitimate, etc.) base station of a network.

If the release signal is not received from the base station, in operation S405, it is determined whether or not SMS message is received from the base station. If the SMS message is received from the base station, in operation S406, the base station is identified as a pseudo-base station. However, if the SMS message is not received from the base station, the method will return to operation step S404, and continues to monitor whether or not the release signal is received from the base station.

Figure 5:
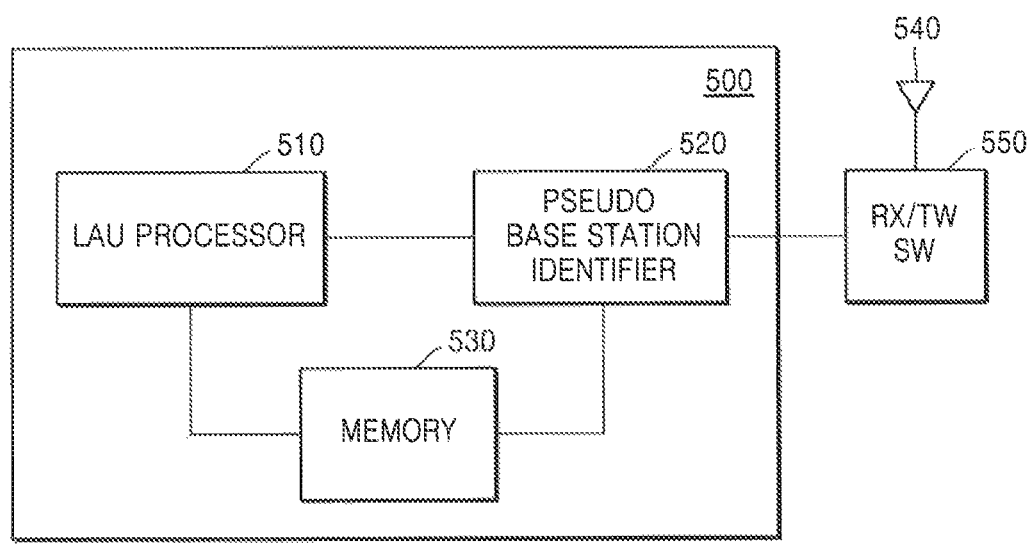
FIG. 5 is a block diagram illustrating a device for identifying a pseudo-base station in a mobile terminal according to an embodiment of the inventive concept.

FIG. 5 is a block diagram illustrating a device for identifying a pseudo-base station in a mobile terminal according to an embodiment of the inventive concept.

Referring to FIG. 5, the device 500 for identifying the pseudo-base station in the mobile terminal may include hardware such as a location update (LAU) processor 510, a pseudo-base station identifier circuit 520, at least one memory 530, at least one antenna 540, and a switch 550 if a single antenna is used for transmitting and receiving. The location update processor 510 be configured to send a LAU Request to a base station of a current cell, and to receive a LAU Accept from the base station indicating that LAU has been performed. The pseudo-base station identifier circuit 520 may identify the authenticity of the base station based on whether or not TMSI information is included in the LAU Accept. When the LAU Accept does not include the TMSI information, the pseudo-base station identifier 520 may identify the base station as being a pseudo-base station. On the other hand, When the LAU Accept includes the TMSI information, the pseudo-base station identifier 520 may identify the authenticity of the base station based on whether or not a release signal (for example, Channel Release signaling) of the control channel allocated for the LAU is received from the base station. If the release signal is received from the base station, the pseudo-base station identifier 520 may identify the base station as being the genuine (e.g. authentic) base station. Alternatively, the pseudo-base station identifier 520 may identify the authenticity of the base station based on whether or not a SAPI3 Downlink Establish Request is received from the base station before the release signal is received. When the SAPI3 Downlink Establish Request is received from the base station before the release signal is received, the pseudo-base station identifier 520 may identify the base station as being the pseudo-base station. When the SAPI3 Downlink Establish Request is not received from the base station before the release signal is received, the pseudo-base station identifier 520 may further identify the authenticity of the base station based on whether or not the release signal is received from the base station.

The method and the device for identifying the pseudo-base station in the mobile terminal according to the embodiment of the inventive concept can increase reliability and accuracy of identifying the pseudo-base station and reduce network loads. The method and the device according to the inventive concept may identify a pseudo-base station even in the event that the pseudo-base station is disguised as a normal base station. In addition, the method and the device according to the inventive concept may further avoid the time delay residing in a network caused by the mobile terminal reselecting a cell after the pseudo-base station has been identified.

The method for identifying the pseudo-base station in the mobile terminal according to an embodiment of the inventive concept can also be embodied as computer readable codes on a computer readable recording medium. The computer readable recording medium may comprise any data storage device that can store data which can be thereafter read and executed by a computer system. Examples of the computer readable recording medium include Read-Only Memory (ROM), Random-Access Memory (RAM), CD-ROMs, magnetic tapes, floppy disks, and optical data storage devices. The computer readable recording medium can also be distributed over network-coupled computer systems so that the computer-readable code is stored and executed in a distributed fashion. Also, functional programs, codes and code segments to accomplish the paging collision resolution method for the dual SIM card terminal according to an embodiment of the inventive concept can be constructed by a programmer of ordinary skill in the art.

Although some embodiments of the inventive concept have been shown and described, it will be understood by those skilled in the art that modifications can be made to these embodiments without departing from the principles and the spirit of the inventive concept, the scope of which is defined by the claims and their equivalents.

What is claimed is:
1. A method for identifying a pseudo-base station by a mobile terminal, comprising;
  sending a Location Area Update (LAU) Request to a base station of a current cell;
  receiving an LAU Accept response from the base station indicating that LAU has been performed; and identifying an authenticity of the base station based on whether or not a Temporary Mobile Subscriber Identity (TMSI) information is included in the LAU Accept response, wherein identifying the authenticity of the base station further includes determining whether or not a release signal of a control channel allocated for the LAU is received from the base station, and wherein the authenticity of the base station is identified based on whether or not a Service Access Point Identifier (SAP) Downlink Establish Request is received from the base station prior to receiving the release signal.

2. The method of claim 1, wherein the identifying that the authenticity of the base station comprises identifying that the base station is a pseudo-base station when the LAU Accept response does not include the TMSI information.

3. The method of claim 1, further comprising;
storing the TMSI information when the LAU Accept response includes the TMSI information; and
sending an LAU Complete to the base station.

4. The method of claim 3, further comprising identifying that the base station is authentic when the release signal of the control channel allocated for the LAU is received from the base station.

5. The method of claim 2, wherein the SAPI Downlink Establish Request comprises a SAPI3 Downlink Establish Request.

6. The method of claim 5, wherein identifying the authenticity of the base station includes identifying that the base station is a pseudo-base station when the SAPI3 Downlink Establish Request is received prior to receiving the release signal.

7. The method of claim 6, wherein in response to identifying that the base station is a pseudo-base station, selecting, by the mobile terminal, to reside in a previous cell.

8. A computer-readable storage medium storing instructions that, when executed by a processor, cause the processor to perform the method for identifying the pseudo-base station in the mobile terminal of claim 1.

9. A device for identifying a pseudo-base station by a mobile terminal, comprising;
a Location Area Update (LAU) processor configured to send an LAU Request to a base station of a current cell, and to receive a LAU Accept response from the base station indicating that LAU has been performed; and
a pseudo-base station identifier circuit configured to identify an authenticity of the base station based on whether or not a Temporary Mobile Subscriber Identity (TMSI) information is included in the LAU Accept response, wherein the pseudo-base station identifier circuit is further configured to identify the authenticity of the base station based on whether or not a release signal of a control channel allocated for the LAU is received from the base station, when the LAU Accept response includes the TMSI information, and wherein the pseudo-base station identifier circuit is further configured to identify the authenticity of the base station based on whether or not a Service Access Point Identifier (SAPI) Downlink Establish Request is received from the base station before receiving the release signal.

10. The device of claim 9, wherein the pseudo-base station identifier circuit is configured to identify that the base station is a pseudo-base station when the LAU Accept response does not include the TMSI information.

11. The device of claim 9, wherein the SAPI Downlink Establish Request comprises a SAPI3 Downlink Establish Request.

12. The device of claim 9, wherein the pseudo-base station identifier circuit is further configured to identify that the base station is a pseudo-base station when the SAPI Downlink Establish Request is received before receiving the release signal.

13. The device of claim 11, further comprising at least one memory configured to store TMSI information.

14. The device of claim 13, wherein the at least one memory connected to at least one of the LAU processor and the pseudo base station identifier circuit, and the at least one memory is further configured to store a list of pseudo-base stations, and wherein at least one of the pseudo-base station identifier circuit and the LAU processor is configured to update a list of pseudo-base stations stored in the at least one memory.

15. The device according to claim 14, wherein the device comprises a mobile terminal.

* * * * *